United States Patent
Morikawa et al.

(10) Patent No.: US 6,596,819 B2
(45) Date of Patent: Jul. 22, 2003

(54) POLYISOCYANATE CURING AGENT FOR LAMINATE ADHESIVE AND PROCESS FOR PRODUCTION THEREOF

(75) Inventors: Yukihiro Morikawa, Kanagawa-ken (JP); Ichiro Higashikubo, Kanagawa-ken (JP); Kouji Yoshida, Kanagawa-ken (JP); Toshiaki Sasahara, Kanagawa-ken (JP)

(73) Assignee: Nippon Polyurethane Industry Co., Ltd., Tokyo (JP)

( * ) Notice: Subject to any disclaimer, the term of this patent is extended or adjusted under 35 U.S.C. 154(b) by 0 days.

(21) Appl. No.: 09/915,256

(22) Filed: Jul. 27, 2001

(65) Prior Publication Data

US 2003/0083451 A1 May 1, 2003

(51) Int. Cl.⁷ ............................................. C08G 18/00
(52) U.S. Cl. ......................... 525/457; 528/85; 528/59; 544/180; 544/193; 525/458; 556/414
(58) Field of Search ..................... 528/59, 85; 544/182, 544/193; 525/457, 458; 556/414

(56) References Cited

FOREIGN PATENT DOCUMENTS

| JP | 60-015419 | 7/1983 |
| JP | 63-110272 | 10/1986 |
| JP | 05-112766 | 3/1991 |
| JP | 07-048429 | 12/1992 |
| JP | 05-051574 | 3/1993 |
| JP | 09-316422 | 5/1996 |
| JP | 11-050036 | 7/1997 |
| JP | 11-181394 | 12/1997 |

*Primary Examiner*—Robert Dawson
*Assistant Examiner*—Kim-Liang Peng
(74) *Attorney, Agent, or Firm*—Browdy and Neimark, P.L.L.C.

(57) ABSTRACT

A polyisocyanate curing agent for laminate adhesive, comprising:

(A) an isocyanate group-terminated prepolymer having isocyanurate group and urethane group, obtained by reacting an organic polyisocyanate containing at least (a1) an aromatic diisocyanate with an active hydrogen group-containing compound containing at least (a2) a diol compound having a number-average molecular weight of 100 to 2,000, and, as an optional component, (B) an isocyanate group-terminated prepolymer having urethane group, and, also as an optional component, (C) a silane coupling agent represented by the following general formula (1):

$$OCN-(CH_2)_m-Si(OR)_3 \qquad (1)$$

(wherein R is a methyl group or an ethyl group, and m is an integer of 1 to 5); and a process for producing the polyisocyanate curing agent. The polyisocyanate curing agent is usable in a laminate adhesive which can be aged in a short time without shortening the pot life, which has good adhesivity, and which can withstand a severe retort treatment.

15 Claims, No Drawings

POLYISOCYANATE CURING AGENT FOR LAMINATE ADHESIVE AND PROCESS FOR PRODUCTION THEREOF

BACKGROUND OF THE INVENTION (1) Field of the Invention

The present invention relates to a polyisocyanate curing agent for a laminate adhesive which can be aged in a short time without shortening the pot life and which has good adhesivity, as well as to a process for production of the polyisocyanate curing agent.

(2) Related Prior Art

Recently, as a packaging method, complex flexible packaging has been remarkably developed for reasons such as strength of package, protectability for goods packed, workability during packaging, propaganda effect of package, reduction of packaging cost caused by the use of a film supplied in a large amount at a low cost, and the like. In the complex flexible packaging, there is used a laminated film or sheet produced using an adhesive. The current main stream of such a laminate adhesive is a two-pack type polyurethane adhesive generally composed of a base resin having active hydrogen group and a curing agent having isocyanate group, because the two-pack type polyurethane adhesive is excellent in adhesivity, low-temperature resistance and heat resistance and further it can be widely applied to various adherends such as plastics, metal foils and the like.

As such a laminate adhesive, there is disclosed, in JP-A-5-51574, an adhesive composition comprising a polyester polyurethane polyol, a carboxyl group-terminated polyester resin mixture, orthophosphoric acid or an ester thereof, an organic isocyanate compound and, as necessary, a silane coupling agent. According to the literature, as the organic isocyanate compound, there can be used a urethane bond-containing polyisocyanate derived from tolylene diisocyanate or an isocyanurate bond-containing polyisocyanate derived from tolylene diisocyanate.

In JP-A-63-110272 is disclosed an adhesive composition for complex laminate composed of at least one kind of polyol selected from polyether polyols, polyester polyols, polyether-urethane polyols and polyester-urethane polyols, an isocyanate group-containing silane coupling agent and a polyisocyanate curing agent.

In laminate adhesives, the shortening of curing time has been required. In most of the curing agents used in conventional laminate adhesives, however, no consideration has been made on the reactivity with the base resin. As a result, the curing of adhesive after application is slow, making necessary a step of curing acceleration, i.e. aging. Specifically explaining, it is necessary to store a laminated film in a warm chamber of 35 to 60° C. for about 3 to 5 days to conduct aging and sufficiently cure the adhesive used in the laminated film. At that time, the curing degree of the adhesive differs depending upon the aging conditions, which may allow the laminated film to vary in adhesion strength; in case of insufficient aging, delamination due to the insufficient curing of the adhesive may take place. Particularly in aliphatic polyurethane adhesives, a fairly long time is needed for the curing reaction. Such an aging step is essential in a dry lamination process and makes it difficult to respond to a request for short delivery period. Also in the aging step, there have been necessary an investment for construction of a warm house for conducting aging and a cost for utilities for temperature maintenance. In the technique described in JP-A-63-110272, no consideration is made to the shortening of aging time although improvements are achieved in the adhesivity, chemical resistance and heat resistance of the laminate adhesive.

In order to achieve the shortening of aging time, it is generally effective to add an additive. As such a technique, there can be mentioned a technique described in JP-A-9-316422. In the technique described in JP-A-9-316422, a catalyst is added to a polyurethane resin (a solution); as a result, a shorter aging time is obtained but there is a problem that the pot life after mixing of the base resin and the curing agent is shortened as well. An adhesive of short pot life tends to be used in an excessive amount and, moreover, solidifies often and impairs the applicator.

In JP-A-60-15419 is described a polyisocyanate resin (as a curing agent) obtained by reacting an isocyanurate bond-containing polyisocyanate derived from tolylene diisocyanate, with a polyhydric alcohol having a number-average molecular weight of 5,000 or less. As the organic polyisocyanate (as a curing agent) described in JP-A-5-51574, there are mentioned low-molecular isocyanate compounds, polyurethane isocyanates obtained by reacting such a low-molecular isocyanate compound with water or a polyhydric alcohol, dimers or trimers of low-molecular isocyanate compound, etc.

According to the description of JP-A-60-15419, the polyisocyanate resin is useful as a curing agent for coatings but its use as a curing agent for laminate adhesive is not mentioned. According to the description of JP-A-5-51574, no mention is made on any isocyanate group-terminated prepolymer having urethane group and isocyanurate group, obtained by reacting a diisocyanate and a high-molecular polyol. With the polyisocyanate curing agent described in JP-A-5-51574, it is impossible to achieve a shorter aging time without shortening the pot life.

OBJECTS AND SUMMARY OF THE INVENTION

The objects of the present invention are to provide a polyisocyanate curing agent for use in a laminate adhesive which can be aged in a short time without shortening the pot life, which has good adhesivity and which can withstand a severe retort treatment; and a process for producing such a polyisocyanate curing agent.

The present inventors made a study and found out that the above objects could be achieved by a polyisocyanate curing agent having particular groups, obtained by a particular polyisocyanate and a particular polyol. The finding has led to the completion of the present invention.

The present invention lies in the following 1 to 10.

1. A polyisocyanate curing agent for laminate adhesive, comprising:
   (A) an isocyanate group-terminated prepolymer having isocyanurate group and urethane group, obtained by reacting an organic polyisocyanate containing at least (a1) an aromatic diisocyanate, with an active hydrogen group-containing compound containing at least (a2) a diol compound having a number-average molecular weight of 100 to 2,000.

2. A polyisocyanate curing agent for laminate adhesive, comprising:
   (A) an isocyanate group-terminated prepolymer having isocyanurate group and urethane group, obtained by reacting an organic polyisocyanate containing at least (a1) an aromatic diisocyanate, with an active hydrogen group-containing compound containing at least (a2) a diol compound having a number-average molecular weight of 100 to 2,000, and
(B) an isocyanate group-terminated prepolymer having urethane group.

3. A polyisocyanate curing agent for laminate adhesive, comprising:
(A) an isocyanate group-terminated prepolymer having isocyanurate gorup and urethane group, obtained by reacting an organic polyisocyanate containing at least (a1) an aromatic diisocyanate, with an active hydrogen group-containing compound containing at least (a2) a diol compound having a number-average molecular weight of 100 to 2,000, and
(C) a silane coupling agent represented by the following general formula (1):

$$OCN-(CH_2)_m-Si(OR)_3 \quad (1)$$

(wherein R is a methyl group or an ethyl group, and m is an integer of 1 to 5).

4. A polyisocyanate curing agent for laminate adhesive, comprising:
(A) an isocyanate group-terminated prepolymer having isocyanurate group and urethane group, obtained by reacting an organic polyisocyanate containing at least (a1) an aromatic diisocyanate, with an active hydrogen group-containing compound containing at least (a2) a diol compound having a number-average molecular weight of 100 to 2,000,
(B) an isocyanate group-terminated prepolymer having urethane group, and
(C) a silane coupling agent represented by the following general formula (1):

$$OCN-(CH_2)_m-Si(OR)_3 \quad (1)$$

(wherein R is a methyl group or an ethyl group, and m is an integer of 1 to 5).

5. A process for producing a polyisocyanate curing agent for laminate adhesive set forth in the above 1, which comprises the following Steps (1) and (2):
(1) a step of subjecting an organic polyisocyanate containing at least (a1) an aromatic diisocyanate and an active hydrogen group-containing compound containing at least (a2) a diol compound having a number-average molecular weight of 100 to 2,000, to a urethanization reaction to produce a urethane bond-containing polyisocyanate, and
(2) a step of subjecting the urethane bond-containing polyisocyanate to an isocyanurate-forming reaction to produce (A) an isocyanate group-terminated prepolymer having isocyanurate group and urethane group.

6. A process for producing a polyisocyanate curing agent for laminate adhesive set forth in the above 1, which comprises the following steps (3) and (4):
(3) a step of subjecting an organic polyisocyanate containing at least (a1) an aromatic diisocyanate to an isocyanurate-forming reaction to produce an isocyanurate bond-containing polyisocyanate, and
(4) a step of subjecting the isocyanurate bond-containing polyisocyanate and an active hydrogen group-containing compound containing at least (a2) a diol compound having a number-average molecular weight of 100 to 2,000, to a urethanization reaction to produce (A) an isocyanate group-terminated prepolymer having isocyanurate group and urethane group.

7. A process for producing a polyisocyanate curing agent for laminate adhesive set forth in the above 1, which comprises the following step (5):
(5) a step of subjecting an organic polyisocyanate containing at least (a1) an aromatic diisocyanate and an active hydrogen group-containing compound containing at least (a2) a diol compound having a number-average molecular weight of 100 to 2,000, to a urethanization reaction and an isocyanurate-forming reaction simultaneously to produce (A) an isocyanate group-terminated prepolymer having isocyanurate group and urethane group.

8. A process for producing a polyisocyanate curing agent for laminate adhesive set forth in the above 2, which comprises the following steps (1), (2) and (6):
(1) a step of subjecting an organic polyisocyanate containing at least (a1) an aromatic diisocyanate and an active hydrogen group-containing compound containing at least (a2) a diol compound having a number-average molecular weight of 100 to 2,000, to a urethanization reaction to produce a urethane bond-containing polyisocyanate,
(2) a step of subjecting the urethane bond-containing polyisocyanate to an isocyanurate-forming reaction to produce (A) an isocyanate group-terminated prepolymer having isocyanurate group and urethane group, and
(6) a step of mixing the isocyanate group-terminated prepolymer (A) having isocyanurate group and urethane group, with (B) an isocyanate group-terminated prepolymer having urethane group.

9. A process for producing a polyisocyanate curing agent for laminate adhesive set forth in the above 2, which comprises the following steps (3), (4) and (7):
(3) a step of subjecting an organic polyisocyanate containing at least (a1) an aromatic diisocyanate to an isocyanurate-forming reaction to produce an isocyanurate bond-containing polyisocyanate,
(4) a step of subjecting the isocyanurate bond-containing polyisocyanate and an active hydrogen group-containing compound containing at least (a2) a diol compound having a number-average molecular weight of 100 to 2,000, to a urethanization reaction to produce (A) an isocyanate group-terminated prepolymer having isocyanurate group and urethane group, and
(7) a step of mixing the isocyanate group-terminated prepolymer (A) having isocyanurate group and urethane group, with (B) an isocyanate group-terminated prepolymer having urethane group.

10. A process for producing a polyisocyanate curing agent for laminate adhesive set forth in the above 2, which comprises the following steps (5) and (8):
(5) a step of subjecting an organic polyisocyanate containing at least (a1) an aromatic diisocyanate and an active hydrogen group-containing compound containing at least (a2) a diol compound having a number-average molecular weight of 100 to 2,000, to a urethanization reaction and an isocyanurate-forming reaction simultaneously to produce (A) an isocyanate group-terminated prepolymer having isocyanurate group and urethane group, and
(8) a step of mixing the isocyanate group-terminated prepolymer (A) having isocyanurate group and urethane group, with (B) an isocyanate group-terminated prepolymer having urethane group.

DETAILED DESCRIPTION OF THE INVENTION

The present invention is described in detail below.

First, description is made on the raw materials used in the present invention.

The isocyanate group-terminated prepolymer (A) having isocyanurate group and urethane group, used in the present invention is obtained by subjecting an organic polyisocyanate containing at least (a1) an aromatic diisocyanate and an active hydrogen group-containing compound containing at least (a2) a diol compound having a number-average molecular weight of 100 to 2,000, to an isocyanurate-forming reaction and a urethanization reaction in such proportions that the isocyanate group is an excess relative to the active hydrogen group.

As the aromatic diisocyanate (a1), there can be mentioned, for example, 2,4-tolylene diisocyanate (hereinafter abbreviated to 2,4-TDI), 2,6-tolylene diisocyanate (hereinafter abbreviated to 2,6-TDI), xylene-1,4-diisocyanate (hereinafter abbreviated to 1,4-XDI), xylene-1,3-diisocyanate (hereinafter abbreviated to 1,3-XDI), 4,4'-diphenylmethane diisocyanate (hereinafter abbreviated to MDI), 2,4'-diphenylmehtane diisocyanate, 2,2'-diphenylmethane diisocyanate, 4,4'-diphenyl ether diisocyanate, 2-nitrodiphenyl-4,4'-diisocyanate, 2,2'-diphenylpropane-4,4'-diisocyanate, 3,3'-dimethyldiphenylmethane-4,4'-diisocyanate, 4,4'-diphenylpropane diisocyanate, m-phenylene diisocyanate, p-phenylene diisocyanate, naphthylene-1,4-diisocyanate, naphthylene-1,5-diisocyanate, 3,3'-dimethoxydiphenyl-4,4'-diisocyanate, urethane bond-containing polyisocyanates derived from the above diisocyanates (the polyols used for introduction of urethane bond exclude the diol compounds (a2) each having a number-average molecular weight of 100 to 2,000, to be described later), urea bond-containing polyisocyanates derived from the above diisocyanates, biuret bond-containing polyisocyanates derived form the above diisocyanates, uretdione bond-containing polyisocyanates derived from the above diisocyanates, isocyanurate bond-containing polyisocyanates derived from the above diisocyanates, uretdione bond/isocyanurate bond-containing polyisocyanates derived from the above diisocyanates, carbodiimide bond-containing polyisocyanates derived from the above diisocyanates, and uretonimine bond-containing polyisocyanates derived from the above diisocyanates. These compounds can be used singly or in admixture of two or more kinds.

Preferred as the aromatic diisocyanate (a1) is 2,4-TDI and/or 2,6-TDI and particularly preferred is 2,4-TDI, in view of the reactivity of curing agent with the base resin of laminate adhesive, the productivity of curing agent, the adhesivity of resulting adhesive, etc.

In the present invention, the aromatic diisocyanate (a1) can be used as necessary with other organic polyisocyanate. As the other organic polyisocyanate, there can be mentioned, for example, aromatic polyisocyanates such as polyphenylene polymethylene polyisocyanate, crude TDI and the like; aliphatic diisocyanates such as tetramethylene diisocyanate, hexamethylene diisocyanate (hereinafter abbreviated to HDI), decamethylene diisocyanate, lysine diisocyanate and the like; alicyclic diisocyanates such as isophorone diisocyanate (hereinafter abbreviated to IPDI), hydrogenated TDI, hydrogenated xylylene diisocyanate (hereinafter abbreviated to $H_6XDI$), hydrogenated diphenylmethane diisocyanate, tetramethylxylylene diisocyanate and the like; urethane bond-containing polyisocyanates derived from the above poly- or diisocyanates; urea bond-containing polyisocyanates derived from the above poly- or diisocyanates; biuret bond-containing polyisocyanates derived from the above poly- or diisocyanates; uretdione bond-containing polyisocyanates derived from the above poly- or diisocyanates; isocyanurate bond-containing polyisocyanates derived from the above poly- or diisocyanates; uretdione bond/isocyanurate bond-containing polyisocyanates derived from the above poly- or diisocyanates; carbodiimide bond-containing polyisocyanates derived from the above poly- or diisocyanates; and uretonimine bond-containing polyisocyanates derived from the above poly- or diisocyanates.

The diol compound (a2) is a compound having substantially two hydroxyl groups in the molecule and a number-average molecular weight of preferably 100 to 2,000, particularly preferably 500 to 1,800.

When the number-average molecular weight of the diol compound (a2) is less than the lower limit, the resulting adhesive tends to have low adhesivity. When the number-average molecular weight is more than the upper limit, the resulting adhesive tends to require a long time for completion of adhesion.

Incidentally, "having substantially two hydroxyl groups" refers to having about two hydroxyl groups in each molecule. In the case of, for example, a polyester diol, part of the terminals is carboxyl group in a strict sense; however, since the carboxyl group is generally about 1% or less of the moles of hydroxyl group, the diol may be regarded as a substantially complete diol compound.

When the hydroxyl groups of the diol compound (a2) are substantially more than two, gelling may take place during production of a polyisocyanate curing agent. When the hydroxyl groups are less than two, the resulting laminate adhesive may have inferior properties.

As the diol compound (a2), there can be mentioned, for example, a polyester diol, a polyester amide diol, a polyether diol, a polyester ether diol, a polycarbonate diol, a polycarbonate ester diol, a polycarbonate ether diol and a polyolefin diol. These compounds can be used singly or in admixture of two or more kinds.

As the polyester diol and the polyester amide diol, there can be mentioned, for example, those compounds obtained by subjecting the following two kinds of compounds to a dehydration-condensation reaction:

at least one kind of compound selected from known dicarboxylic acids (e.g. succinic acid, adipic acid, sebacic acid, azelaic acid, terephthalic acid, isophthalic acid, orthophthalic acid, hexahydroterephthalic acid, hexahydroisophthalic acid, hexahydroorthophthalic acid and naphthalenedicarboxylic acid), acid esters, acid anhydrides, etc., and at least one kind of compound selected from low-molecular diols (e.g. ethylene glycol, 1,2-propanediol, 1,3-propanediol, 2-methyl-1,3-propanediol, 1,2-butanediol, 1,3-butanediol, 1,4-butanediol, 1,5-pentanediol, 2-methyl-1,5-pentanediol, 3-methyl-1,5-pentanediol, 1,6-hexanediol, neopentyl glycol, 1,8-octanediol, 1,9-nonanediol, 2,2-diethyl-1,3-propanediol, 2-n-butyl-2-ethyl-1,3-propanediol, 2,2,4-trimethyl-1,3-pentanediol, 2-ethyl-1,3-hexanediol, 2-n-hexadecane-1,2-ethylene glycol, 2-n-eicosane-1,2-ethylene glycol, 2-n-octacosane-1,2-ethylene glycol, diethylene glycol, dipropylene glycol, 1,4-cyclohexanedimethanol, alkylene oxide adduct of bisphenol A, hydrogenated bisphenol A and alkylene oxide adduct of hydrogenated bisphenol A), low-molecular diamines (e.g. hexamethylenediamine, xylylenediamine and isophoronediamine), low-molecular aminoalcohols wherein the total number of hydroxyl group and amino group in each molecule is two (e.g. monoethanolamine and N-mehtylethanolamine), etc. There can also be mentioned, for example, lactone type polyester diols obtained by ring-opening polymerization of a cyclic ester (lactone) monomer such as ε-caprolactone, γ-valerolactone or the like using a starting material such as low-molecular diol, low-molecular diamine or low-molecular aminoalcohol.

As the polycarbonate diol and the polycarbonate ester diol, there can be mentioned, for example, those compounds obtained by an alcohol-eliminating or phenol-eliminating reaction between one of the above-mentioned polyester diol or low-molecular diols used in synthesis thereof and a low-molecular compound having one carbonate group in the molecule (e.g. diethylene carbonate, dimethyl carbonate or diphenyl carbonate).

As the polyether diol, there can be mentioned, for example, poly(oxyethylene) diols, poly(oxypropylene) diols and poly(oxytetramethylene) diols, etc. obtained by ring-opening polymerization of ethylene oxide, propylene oxide, tetrahydrofuran or the like using, as a starting material, the above-mentioned low-molecular diol, low-molecular diamine or low-molecular aminoalcohol used in synthesis of the above-mentioned polyester diol; polyether diols obtained by the copolymerization of the above diols; and polyester ether diols and polycarbonate ether diols produced using, as a starting material, the above-mentioned polyester diol or polycarbonate diol.

As the polyolefin diol, there can be mentioned, for example, a polybutadiene, a hydrogenated polybutadiene, a polyisoprene, a hydrogenated polyisoprene, a chlorinated polypropylene and a chlorinated polyethylene, all having substantially two hydroxyl groups in the molecule.

As the diol compound (a2), there can also be mentioned, for example, the above-mentioned low-molecular diols used in synthesis of polyester diol.

The diol compound (a2) used in the present invention, preferably has side alkyl group in view of the adhesivity, etc. of the resulting adhesive. As such a diol compound, there can be mentioned, for example, polyester diols obtained from a side chain-containing low-molecular diol and a dicarboxylic acid; polycarbonate diols obtained, for example, by an alcohol-eliminating or phenol-eliminating reaction between a side chain containing low-molecular diol and diethylene carbonate, dimethyl carbonate, diethyl carbonate, diphenyl carbonate or the like; and polyether diols obtained by adding an alkylene oxide having 3 or more carbon atoms to an active hydrogen group-containing compound of two functionalities. As the diol compound (a2), particularly preferred are a polyester diol obtained from 3-methyl-1,5-pentanediol and adipic acid, and a poly(oxypropylene)diol.

For improved adhesivity, improved affinity with base resin, etc., the diol compound (a2) having a number-average molecular weight of 100 to 2,000 may be used as necessary in combination with other active hydrogen group-containing compound, for example, the above-mentioned low-molecular diamine, the above-mentioned low-molecular aminoalcohol, a low-molecular polyol [e.g. glycerine, trimethylolpropane (hereinafter abbreviated to TMP) or pentaerythritol], a polyol produced from such a low-molecular polyol, a high-molecular polyol having a number-average molecular weight of more than 2,000, or a low-molecular monool (e.g. polyether monool).

In the isocyanate group-terminated prepolymer (A) having isocyanurate group and urethane group, the content of the isocyanurate group is preferably 5 to 25% by weight, more preferably 6 to 23% by weight in terms of solid content. When the isocyanurate group content is too small, the curing rate of the resulting adhesive is small and the aging time of the adhesive tends to be long. When the isocyanurate group content is too large, the viscosity of the resulting polyisocyanate curing agent is high and its workability tends to be inferior.

In the isocyanate group-terminated prepolymer (A) having isocyanurate group and urethane group, the content of the diol compound (a2) is preferably 10 to 90% by weight, more preferably 15 to 85% by weight in terms of solid content. When the content of (a2) is outside of this range, the adhesion strength of the resulting adhesive tends to be low.

In the isocyanate group-terminated prepolymer (A) having isocyanurate group and urethane group, the content of the isocyanate group is preferably 3 to 15% by weight, more preferably 3 to 10% by weight in terms of solid content. When the isocyanate group content is too small, the adhesion strength of the resulting adhesive tends to be insufficient. When the isocyanate group content is too large, the resulting adhesive tends to have low flexibility or a small curing rate.

The isocyanate group-terminated prepolymer (B) having urethane group, used in the present invention is preferably a compound obtained by subjecting (b1) an organic diisocyanate and (b2) a polyhydric alcohol to a urethanization reaction. Incidentally, the prepolymer (B) has no isocyanurate group.

As the organic diisocyanate (b1), there can be mentioned, for example, the above-mentioned aromatic diisocyanate (a1), aliphatic diisocyanates, alicyclic diisocyanates, urea bond-containing polyisocyanates derived from the above-mentioned diisocyanates, biuret bond-containing polyisocyanates derived from the above-mentioned diisocyanates, carbodiimide bond-containing polyisocyanates derived from the above-mentioned diisocyanates, and uretonimine bond-containing polyisocyanates derived from the above-mentioned diisocyanates. The organic diisocyanate (b1) is preferably an aromatic diisocyanate, particularly TDI for the reactivity.

As the polyhydric alcohol (b2), there can be mentioned, for example, the above-mentioned diol compound (a2); low-molecular polyols (e.g. glycerine, TMP and pentaerythritol); and polyester polyols, polycarbonate polyols and polyether polyols, all produced from the above low-molecular polyols. The polyhydric alcohol (b2) is preferably a compound having substantially 2 to 5 hydroxyl groups and a molecular weight of 62 to 300, in view of the crosslinking efficiency, etc.

In the isocyanate group terminated prepolymer (B) having urethane group, the content of the isocyanate group is preferably 5 to 30% by weight, more preferably 7 to 25% by weight in terms of solid content. When the content of the isocyanate group is too small, the resulting adhesive tends to show an insufficient adhesion strength. When the content of the isocyanate group is too large, the resulting adhesive tends to show low flexibility when cured.

As specific examples of the isocyanate group-terminated prepolymer (B) having urethane group, the followings can be mentioned.

Polyisocyanates obtained by urethanizing TDI with TMP:

Coronate (registered trademark) L produced by Nippon Polyurethane Industry Co., Ltd.
Sumidur (registered trademark) L-75 produced by Sumitomo Bayer Urethane Co., Ltd.

Takenate (registered trademark) D-102 produced by Takeda Chemical Industries, Ltd.

Polyisocyanates obtained by urethanizing HDI with TMP:

Coronate HL produced by Nippon Polyurethane Industry Co., Ltd.
Sumidur HT produced by Sumitomo Bayer Urethane Co., Ltd.
Takenate D-160N produced by Takeda Chemical Industries, Ltd.

Polyisocyanates obtained by urethanizing IPDI with TMP:

Takenate D-140N produced by Takeda Chemical Industries, Ltd.
Mitec (registered trademark) NY215A produced by Mitsubishi Chemical Corporation Polyisocyanate obtained by urethanizing XDI with TMP
Takenate D-110N produced by Takeda Chemical Industries, Ltd.

Polyisocyanate obtained by urethanizing $H_6XDI$ with TMP:

Takenate D-120N produced by Takeda Chemical Industries, Ltd.

In the polyisocyanate curing agent for laminate adhesive according to the present invention, the mixing ratio of the isocyanate group-terminated prepolymer (A) having isocyanurate group and urethane group and the isocyanate group-terminated prepolymer (B) having urethane group is preferably 100/0 to 100/100, particularly preferably 100/5 to 100/100 in terms of weight ratio of solid content. When the proportion of (B) is too large, the resulting adhesive may require a long aging time.

In the present polyisocyanate curing agent for laminate adhesive, comprising (A) and (B), the content of the isocyanate group is preferably 5 to 20% by weight, more preferably 7 to 18% by weight in terms of solid content.

The silane coupling agent (C) used in the present invention is represented by the following general formula (1):

$$OCN-(CH_2)_m-Si(OR)_3 \quad (1)$$

(wherein R is a methyl group or an ethyl group, and m is an integer of 1 to 5).

It is well known that by adding a silane coupling agent to an adhesive, the adhesive is improved in adhesivity, heat resistance, chemical resistance, etc. However, addition of a silane coupling agent to a base resin, particularly a base resin having a functional group such as amino group, epoxy group or the like may give rise to coloring and/or viscosity increase with the lapse of time. This is considered to be because the functional group of the base resin reacts with the alkoxysilyl group or the like of the silane coupling agent. Further, since a silane coupling agent generally has a functional group such as amino group, epoxy group or the like, if the silane coupling agent and a polyisocyanate curing agent are stored in the form of a mixture, the isocyanate group of the curing agent reacts with the functional group of the silane coupling agent and, resultantly, an increase in viscosity may take place with the lapse of time.

Hence, in order for a laminate adhesive to have storage stability, it is advisable to store the adhesive in the form of individual components and mix them right before the use. This, however, needs a larger space for storage and an extra labor in mixing, and a laminate adhesive of two-component type has been desired. Incidentally, when no silane coupling agent is used, an adhesive of two-component type is easily obtained; however, such an adhesive has insufficient adhesivity for obtaining a laminated film capable of withstanding a severe retort treatment. Therefore, a laminate adhesive for severe retort treatment requires a silane coupling agent.

The silane coupling agent (C) used in the present invention has, as functional groups, —NCO and —Si—$(OR)_3$ (wherein R is a methyl group or an ethyl group). Therefore, it does not react with isocyanate group-terminated prepolymers under ordinary storage conditions. As a result, the polyisocyanate curing agent of the present invention has good storage stability.

In the present invention, the amount of the silane coupling agent (C) used is preferably 10% by weight or less, particularly preferably 0.1 to 8% by weight of the total isocyanate group-terminated prepolymers. When the amount of (C) is too large, the resulting adhesive has low adhesivity and the workability during lamination using the adhesive may decrease.

To the polyisocyanate curing agent for laminate adhesive according to the present invention may be added various additives as necessary. As the additives, there can be mentioned, for example, a pigment, a dye, a solvent, a thixotropic agent, an antioxidant, an ultraviolet absorber, an antifoaming agent, a thickening agent, a dispersing agent, a surfactant, a fungicide, a microbicide, an antiseptic agent, a catalyst and a filler. There is no particular restriction as to the addition method of the additives, and a known method can be used.

Next, description is made on the steps employed in the processes for producing the polyisocyanate curing agent of the present invention.

The urethanization reaction step (1) used in the present invention is a step of reacting an organic polyisocyanate containing at least (a1) an aromatic diisocyanate, with an active hydrogen group-containing compound containing at least (a2) a diol compound having a number-average molecular weight of 100 to 2,000. In this step, a known urethanization catalyst can be used; however, the above urethanization reaction proceeds without using such a catalyst. It is because in the urethanization reaction, isocyanate group is present in an excess relative to active hydrogen group and this isocyanate group is bonded directly to aromatic ring, showing high reactivity. Incidentally, the temperature of the urethanization reaction is preferably 0 to 120° C., particularly preferably 20 to 100° C.

The isocyanurate-forming reaction step (2) is conducted by adding an isocyanurate-forming catalyst to the urethane bond-containing polyisocyanate obtained in the step (1).

As the isocyanurate-forming catalyst, there can be used all of such known catalysts as tetraalkylammonium hydroxides (e.g. tetramethylammonium hydroxide, tetraethylammonium hydroxide and tetrabutylammonium hydroxide), organic weak acid salts (e.g. tetramethylammonium acetate, tetraethylammonium acetate and tetrabutylammonium acetate), trialkylhydroxyalkylammonium hydroxides (e.g. trimethylhdyroxypropylammonium hydroxide, trimethylhydroxyethylammonium hydroxide, triethylhydroxypropylammonium hydroxide and triethylhydroxyethylammonium hydroxide), organic weak acid salts (e.g. trimethylhdyroxypropylammonium acetate, trimethylhydroxyethylammonium acetate, triethylhydroxypropylammonium acetate and triethylhydroxyethylammonium acetate), tertiary amines {e.g. triethylamine, triethylenediamine, 1,5-diaza-bicyclo[4.3.0]nonene-5,1,8-diazabicyclo[5.4.0]-undecene-7 and 2,4,6-tris(dimethylaminomethyl)phenol}, metal salts of alkylcarboxylic acids (e.g. acetic acid, caproic acid, caprylic acid, octyl acid, myristic acid and naphthenic acid), and the like.

The amount of the isocyanurate-forming catalyst used is preferably 10 to 10,000 ppm in the reaction system. The catalyst can be added in one portion or in portions. In the case of addition in portions, the amount of each portion may be the same or different. Incidentally, the temperature of the isocyanurate-forming reaction is preferably 0 to 120° C., particularly preferably 20 to 100° C.

When the content of isocyanate group has reached an intended level, a terminator for isocyanurate-forming reaction is added to terminate: the reaction. As the terminator, there can be used known terminators such as inorganic acids (e.g. phosphoric acid and hydrochloric acid), organic acids having sulfonic acid group, sulfamic acid group or the like, esters of the organic acids, acyl halides, and the like.

The addition amount of the terminator for isocyanurate-forming reaction is preferably 0.5 to 2 moles, more preferably 0.8 to 1.8 moles per mole of the isocyanurate-forming catalyst. When the amount of the terminator is too small, the isocyanurate-forming reaction is not terminated and there may take place reduction in isocyanate group content in resulting polyisocyanate curing agent, or gelling. When the amount of the terminator is too large, the resulting polyisocyanate curing agent may have cloudiness or may give rise to reduction in adhesion strength.

The step (3) for isocyanurate-forming reaction in the present process is conducted by adding an isocyanurate-forming catalyst to an organic polyisocyanate containing at least (a1) an aromatic diisocyanate.

The kind and amount of the isocyanurate-forming catalyst, the addition timing and amount of the terminator for isocyanurate-forming reaction, etc. are the same as in the above step (2).

The urethanization reaction step (4) is a step of subjecting, to a urethanization reaction, the isocyanurate bond-containing polyisocyanate obtained in the step (3) and an active hydrogen group-containing compound containing at least (a2) a diol compound having a number-average molecular weight of 100 to 2,000.

In this urethanization reaction as well, a known urethanization catalyst can be used; however, it may not be used.

In the present invention, the step (5) is a step of feeding an organic polyisocyanate containing at least (a1) an aromatic diisocyanate and an active hydrogen group-containing compound containing at least (a2) a diol compound having a number-average molecular weight of 100 to 2,000 and then adding thereto an isocyanurate-forming catalyst to give rise to a reaction. As mentioned previously, this step proceeds without using any urethanization catalyst; in this step, therefore, an isocyanurate-forming reaction and a urethanization reaction take place simultaneously.

The kind and addition amount of the isocyanurate-forming catalyst, the addition timing and amount of the terminator, etc. are the same as in the above step (2).

In each of the above processes of the present invention, the molar ratio of the fed organic polyisocyanate containing at least (a1) an aromatic diisocyanate and the fed active hydrogen group-containing compound containing at least (a2) a diol compound is preferably 2/1 to 100/1, particularly preferably 3/1 to 50/1. When the proportion of the active hydrogen group-containing compound is too large, the resulting curing agent tends to have too high a viscosity.

When the proportion of the active hydrogen group-containing compound is too small, the resulting adhesive tends to have low adhesivity.

In the present process, the mixing step (6) is a step of mixing the isocyanate group-terminated prepolymer (A) having isocyanurate group and urethane group, obtained from the step (1) and the step (2), with an isocyanate group-terminated prepolymer (B) having urethane group. The mixing conditions are not critical; however, use of a mixing temperature of 30 to 80° C. is preferred because it can reduce the viscosity of the reaction system and give an increased mixing efficiency.

The step (7) and the step (8) can be conducted in the same manner as for the step (6).

In each of the present production processes mentioned above, the isocyanurate-forming reaction is preferably conducted using an organic solvent. It is because in the isocyanurate-forming reaction, the reaction product becomes a three-dimensional structure and becomes hardly soluble in solvents.

The organic solvent may be any solvent as long as it is inactive to isocyanate group. There can be mentioned, for example, aromatic hydrocarbon type solvents such as toluene, xylene and the like; ester type solvents such as ethyl acetate, butyl acetate and the like; ketone type solvents such as methyl ethyl ketone, cyclohexanone and the like; glycol ether ester type solvents such as ethylene glycol ethyl ether acetate, propylene glycol methyl ether acetate, ethyl-3-ethoxypropionate and the like; ether type solvents such as tetrahydrofuran, dioxane and the like; aprotic polar solvents such as dimethylformamide, dimethylacetamide, N-methylpyrrolidone, furfural and the like. These solvents can be used singly or in admixture of two or more kinds. Incidentally, each reaction is conducted in a solid content of preferably 10 to 90% by weight, more preferably 20 to 80% by weight. When the solid content is too low, the reaction time tends to be long. When the solid content is too high, the reaction product tends to solidify, resulting in reduced workability. In the present invention, there is preferred an ester type solvent (which remains in a smaller amount after lamination), particularly an acetic acid ester type solvent.

In the thus-obtained polyisocyanate curing agent, the content of free (unreacted) aromatic diisocyanate is preferably 1% by weight or less. When the content of free aromatic diisocyanate is too high, the odor thereof may deteriorate working environment.

In any of the above steps, various additives may be added after or before the reaction. The method of addition of the additives is not critical and a known method can be used.

The silane coupling agent (C) can be as necessary mixed with the isocyanate group-terminated prepolymer (A) having isocyanurate group and urethane group, obtained as above, or with the isocyanate group-terminated prepolymer (A) having isocyanurate group and urethane group and the isocyanate group-terminated prepolymer (B) having urethane group, to obtain an intended polyisocyanate curing agent for laminate adhesive.

The polyisocyanate curing agent of the present invention is compounded with an active hydrogen group-containing resin as a base resin; and the mixture is used as an adhesive by, for example, coating on an adherend. The resin used as a base resin has no particular restriction as to the kind and can be any resin as long as it has active hydrogen group. As the resin, there can be specifically mentioned a polyurethane resin, a polyamide resin, a saturated or unsaturated polyester resin, a saturated or unsaturated fatty acid-modified alkyd resin, an acrylic resin, a fluororesin, an epoxy resin, a cellulose resin, etc. A preferred base resin is a polyurethane resin showing good adhesivity between different adherends and having excellent durability.

A specific example of such a polyurethane resin is a polyester type polyurethane resin soluble in organic solvents. This polyurethane resin preferably has, at the timing of right before coating, a number-average molecular weight of 1,000 to 100,000, a solid content of 5 to 80% by weight, a viscosity of 10,000 mpa.s or less at 25° C., in view of the coatability in lamination, adhesion strength, etc.

The compounding ratio of the base resin and the curing agent is preferably active hydrogen group/isocyanate group=9:1 to 1:9 in terms of molar ratio in adhesive.

As the applicator of an adhesive containing the polyisocyanate curing agent of the present invention, there can be mentioned known applicators such as airless spray machine, air spray machine, immersion, roll coater, brush and the like.

The conditions used for lamination using an adhesive containing the present polyisocyanate curing agent are preferably 10 to 180° C. and 0.1 to 1 MPa, particularly preferably 20 to 150° C. and 0.2 to 0.8 MPa.

In producing a laminated film by using an adhesive containing the present polyisocyanate curing agent, the film used is not critical. As the film, there can be mentioned a film of polyester type such as polyethylene terephthalate or the like; a film of polyolefin type such as polyethylene, polypropylene or the like; a film of polyamide type such as nylon or the like; a metal foil such as aluminum foil, copper foil or the like; an ethylene-vinyl acetate copolymer or a saponification product thereof; a cellophane; a polyvinyl chloride; a polyvinylidene chloride; a polystyrene; a paper; and so forth. There can also be suitably used stretched products thereof and surface-treated (e.g. corona discharge-treated or surface-coated) products thereof.

The adhesive containing the polyisocyanate curing agent of the present invention can be suitably used for lamination not only between two film layers but also between three or more film layers.

The conditions for aging after lamination with the adhesive containing the present polyisocyanate curing agent are preferably 20 to 70° C. and 5 hours or more, particularly preferably 25 to 50° C. and 10 hours or more. Incidentally, the same temperature and 48 hours or more have been necessary in aging after lamination with conventional known laminate adhesives.

As described above, the polyisocyanate curing agent of the present invention, when used in a laminate adhesive, enables shortening of the aging time of the laminate adhesive without shortening of the pot life of the laminate adhesive; therefore, when a laminated film is produced using the laminate adhesive, the production efficiency of the laminated film is significantly improved. The laminate adhesive using the polyisocyanate curing agent of the present invention has good adhesivity and the laminated film produced using the laminate adhesive can withstand even a severe retort treatment. Further, the polyisocyanate curing agent of the present invention is usable not only in a laminate adhesive but also in an ordinary two-pack type adhesive, a coating, a magnetic recording medium, a coating agent, a primer, a printing ink, a sealing material, etc.

DESCRIPTION OF THE PREFERRED EMBODIMENTS

The present invention is described in more detail below by way of Examples and Comparative Examples. However, the present invention should not be construed to be limited to only the Examples. Incidentally, in the Examples and the Comparative Examples, "%" refers to "% by weight" in all cases.

[Production of Isocyanate Group-terminated Prepolymers Having Isocyanurate Group and Urethane Group]

The abbreviated expressions for the raw materials used in Synthesis Examples 1 to 11 are as follows.

TDI (1): 2,4-TDI

TDI (2): a mixture of 2,4-TDI/2,6-TDI=80/20 (weight ratio)

Polyol A: a polyether diol obtained by adding propylene oxide to 1,2-propanediol, number-average molecular weight=500

Polyol B: a polyether diol obtained by adding propylene oxide to 1,2-propanediol, number-average molecular weight=1,000

Polyol C: a polyether diol obtained by adding propylene oxide to 1,2-propanediol, number-average molecular weight=1,500

Polyol D: a polyester diol obtained from 3-methyl-1,5-pentanediol and adipic acid, number-average molecular weight=1,000

Polyol E: a polyester diol obtained from 3-methyl-1,5-pentanediol and adipic acid, number-average molecular weight=3,000

Monool A: a polyether monool obtained by adding ethylene oxide to methanol, number-average molecular weight=400

SYNTHETIC EXAMPLE 1

The inside of a 1-liter reactor provided with a stirrer, a thermometer, a nitrogen gas-introducing tube and a condenser was replaced with nitrogen. Into the reactor were fed 100 g of TDI (1) and 140 g of ethyl acetate, followed by uniform stirring. Thereinto was fed 0.5 g of magnesium naphthenate, after which an isocyanurate-forming reaction was allowed to take place at 75° C. for 5 hours. Then, 0.05 g of phosphoric acid was fed and stirring was conducted at 60° C. for 1 hour to terminate the isocyanurate-forming reaction. IR analysis confirmed the presence of isocyanate group and isocyanurate group in the reaction product. In the reaction product, the content of the isocyanate group was 9.2% and accordingly the content of the isocyanurate group was 10.7%.

Next, thereinto was fed 37.8 g of a polyol A and a reaction was allowed to take place at 75° C. for 3 hours to obtain an isocyanate group-terminated prepolymer NCO-A1. IR analysis of NCO-A1 confirmed the presence of isocyanate group, isocyanurate group and urethane group in NCO-A1, but the presence of hydroxyl group could not be confirmed. In NCO-A1, the content of the isocyanate group was 5.7% and accordingly the content of the isocyanurate group was 9.3%. The solid content was 50.0%. The content of free TDI (1) obtained by gel permeation chromatography (GPC) was 0.2%.

SYNTHESIS EXAMPLE 2

The inside of the same reactor as used in Synthesis Example 1 was replaced with nitrogen. Into the reactor were fed 100 g of TDI (1) and 175 g of ethyl acetate, followed by uniform stirring. Thereinto was fed 0.5 g of magnesium naphthenate, after which an isocyanurate-forming reaction was allowed to take place at 75° C. for 5 hours. Then, 0.05 g of phosphoric acid was fed and stirring was conducted at 60° C. for 1 hour to terminate the isocyanurate-forming reaction. IR analysis confirmed the presence of isocyanate group and isocyanurate group in the reaction product. In the reaction product, the content of the isocyanate group was 7.6% and accordingly the content of the isocyanurate group was 9.9%.

Next, thereinto was fed 73.9 g of a polyol B and a reaction was allowed to take place at 75° C. for 3 hours to obtain an isocyanate group-terminated prepolymer NCO-A2. IR analysis of NCO-A2 confirmed the presence of isocyanate group, isocyanurate group and urethane group in NCO-A2, but the presence of hydroxyl group could not be confirmed. In NCO-A2, the content of the isocyanate group was 4.2% and accordingly the content of the isocyanurate group was 7.8%. The solid content was 49.9%. The content of free TDI (1) obtained by GPC was 0.3%.

SYNTHESIS EXAMPLE 3

The inside of the same reactor as used in Synthesis Example 1 was replaced with nitrogen. Into the reactor were fed 100 g of TDI (1) and 214 g of ethyl acetate, followed by uniform stirring. Thereinto was fed 113.5 g of a polyol C, and a reaction was allowed to take place at 75° C. for 3 hours. IR analysis confirmed the presence of isocyanate group and urethane group in the reaction product, but the presence of hydroxyl group could not be confirmed. The reaction product had a content of isocyanate group of 9.8%.

Thereinto was fed 0.5 g of magnesium naphthenate and an isocyanurate-forming reaction was allowed to take place at 75° C. for 5 hours. Then, 0.05 g of phosphoric acid was fed, and stirring was conducted at 60° C. for 1 hour to terminate the isocyanurate-forming reaction to obtain an isocyanate group-terminated prepolymer NCO-A3. IR analysis of NCO-A3 confirmed the presence of isocyanate group, isocyanurate group and urethane group, but the presence of hydroxyl group could not be confirmed. In NCO-A3, the content of the isocyanate group was 3.7% and accordingly the content of the isocyanurate group was 6.1%. The solid content was 50.0%. The content of free TDI (1) obtained by GPC was 0.3%.

SYNTHESIS EXAMPLE 4

The inside of the same reactor as used in Synthesis Example 1 was replaced with nitrogen. Into the reactor were fed 100 g of TDI (1) and 176 g of ethyl acetate, followed by uniform stirring. Thereinto were fed 73.9 g of a polyol D and 0.5 g of magnesium naphthenate, and an isocyanurate-forming reaction and a urethanization reaction were allowed to take place at 75° C. for 5 hours. Then, 0.05 g of phosphoric acid was fed and stirring was conducted at 60° C. for 1 hour to terminate the isocyanurate-forming reaction to obtain an isocyanate group-terminated prepolymer NCO-A4. IR analysis of NCO-A4 confirmed the presence of isocyanate group, isocyanurate group and urethane group, but no hydroxyl group could be confirmed. In NCO-A4, the content of the isocyanate group was 4.2% and accordingly the content of the isocyanurate group was 7.8%. The solid content was 50.0%. The content of free TDI (1) obtained by GPC was 0.4%.

SYNTHESIS EXAMPLE 5

The inside of the same reactor as used in Synthesis Example 1 was replaced with nitrogen. Into the reactor were fed 100 g of TDI (1) and 172 g of ethyl acetate, followed by uniform stirring. Thereinto was fed 0.5 g of magnesium naphthenate, after which an isocyanurate-forming reaction was allowed to take place at 75° C. for 5 hours. Then, 0.05 g of phosphoric acid was fed and stirring was conducted at 60° C. for 1 hour to terminate the isocyanurate-forming reaction. IR analysis confirmed the presence of isocyanate group and isocyanurate group in the reaction product. In the reaction product, the content of the isocyanate group was 7.6% and accordingly the content of the isocyanurate group was 10.1%.

Next, thereinto were fed 61.6 g of a polyol B and 10.0 g of a monool A, and a reaction was allowed to take place at 75° C. for 3 hours to obtain an isocyanate group-terminated prepolymer NCO-A5. IR analysis of NCO-A5 confirmed the presence of isocyanate group, isocyanurate group and urethane group, but the presence of hydroxyl group could not be confirmed. In NCO-A5, the content of the isocyanate group was 4.2% and accordingly the content of the isocyanurate group was 8.0%. The solid content was 50.0%. The content of free TDI (1) obtained by GPC was 0.3%.

SYNTHESIS EXAMPLE 6

The inside of the same reactor as used in Synthesis Example 1 was replaced with nitrogen. Into the reactor were fed 100 g of TDI (2) and 176 g of ethyl acetate, followed by uniform stirring. Thereinto was fed 0.5 g of magnesium naphthenate, after which an isocyanurate-forming reaction was allowed to take place at 75° C. for 5 hours. Then, 0.05 g of phosphoric acid was fed and stirring was conducted at 60° C. for 1 hour to terminate the isocyanurate-forming reaction. IR analysis confirmed the presence of isocyanate group and isocyanurate group in the reaction product. In the reaction product, the content of the isocyanate group was 7.5% and accordingly the content of the isocyanurate group was 9.8%.

Next, thereinto was fed 73.9 g of a polyol B, and a reaction was allowed to take place at 75° C. for 3 hours to obtain an isocyanate group-terminated prepolymer NCO-A6. IR analysis of NCO-A6 confirmed the presence of isocyanate group, isocyanurate group and urethane group, but the presence of hydroxyl group could not be confirmed. In NCO-A6, the content of the isocyanate group was 4.2% and accordingly the content of the isocyanurate group was 7.8%. The solid content was 50.0%. The content of free TDI (2) obtained by GPC was 0.4%.

SYNTHESIS EXAMPLE 7

The inside of the same reactor as used in Synthesis Example 1 was replaced with nitrogen. Into the reactor were fed 100 g of TDI (1) and 199 g of ethyl acetate, followed by uniform stirring. Thereinto was fed 0.5 g of magnesium naphthenate, after which an isocyanurate-forming reaction was allowed to take place at 75° C. for 5 hours. Then, 0.05 g of phosphoric acid was fed and stirring was conducted at 60° C. for 1 hour to terminate the isocyanurate-forming reaction. IR analysis confirmed the presence of isocyanate group and isocyanurate group in the reaction product. In the reaction product, the content of the isocyanate group was 8.0% and accordingly the content of the isocyanurate group was 8.2%.

Next, thereinto was fed 98.8 g of a polyol B, and a reaction was allowed to take place at 75° C. for 3 hours to obtain an isocyanate group-terminated prepolymer NCO-A7. IR analysis of NCO-A7 confirmed the presence of isocyanate group, isocyanurate group and urethane group, but the presence of hydroxyl group could not be confirmed. In NCO-A7, the content of the isocyanate group was 3.9% and accordingly the content of the isocyanurate group was 6.1%. The solid content was 50.0%. The content of free TDI (1) obtained by GPC was 0.2%.

SYNTHESIS EXAMPLE 8

The inside of the same reactor as used in Synthesis Example 1 was replaced with nitrogen. Into the reactor were fed 100 g of TDI (1) and 106 g of ethyl acetate, followed by uniform stirring. Thereinto was fed 0.5 g of magnesium naphthenate, after which an isocyanurate-forming reaction was allowed to take place at 75° C. for 5 hours. Then, 0.05 g of phosphoric acid was fed and stirring was conducted at 60° C. for 1 hour to terminate the isocyanurate-forming reaction. IR analysis confirmed the presence of isocyanate group and isocyanurate group in the reaction product. In the reaction product, the content of the isocyanate group was 10.7% and accordingly the content of the isocyanurate group was 12.7%.

Next, thereinto was fed 5.8 g of 1,2-propylene glycol, and a reaction was allowed to take place at 75° C. for 3 hours to obtain a polyisocyanate curing agent NCO-B1. IR analysis of NCO-B1 confirmed the presence of isocyanate group, isocyanurate group and urethane group in NCO-B1, but the presence of hydroxyl group could not be confirmed. In NCO-B1, the content of the isocyanate group was 7.4% and accordingly the content of the isocyanurate group was 12.3%. The solid content was 50.1%. The content of free TDI (1) obtained by GPC was 0.2%.

SYNTHESIS EXAMPLE 9

The inside of the same reactor as used in Synthesis Example 1 was replaced with nitrogen. Into the reactor were fed 100 g of TDI (1) and 329 g of ethyl acetate, followed by uniform stirring. Thereinto was fed 227.1 g of a polyol E and a reaction was allowed to take place at 75° C. for 3 hours. IR analysis confirmed the presence of isocyanate group and urethane group in the reaction product, but the presence of hydroxyl group could not be confirmed. The reaction product had a content of isocyanate group of 7.4%.

Thereinto was fed 0.5 g of magnesium naphthenate and an isocyanurate-forming reaction was allowed to take place at 75° C. for 5 hours. Then, 0.05 g of phosphoric acid was fed, and stirring was conducted at 60° C. for 1 hour to terminate the isocyanurate-forming reaction to obtain a polyisocyanate curing agent NCO-B2. IR analysis of NCO-B2 confirmed the presence of isocyanate group, isocyanurate group and urethane group, but the presence of hydroxyl group could not be confirmed. In NCO-B2, the content of the isocyanate group was 2.4% and accordingly the content of the isocyanurate group was 4.0%. The solid content was 50.0%. The content of free TDI (1) obtained by GPC was 0.4%.

SYNTHESIS EXAMPLE 10

The inside of the same reactor as used in Synthesis Example 1 was replaced with nitrogen. In the reactor were fed 200 g of HDI and 98.8 g of a polyol B, and a reaction was allowed to take place at 75° C. for 3 hours. IR analysis confirmed the presence of isocyanate group and urethane group in the reaction product, but the presence of hydroxyl group could not be confirmed. The reaction product had a content of isocyanate group of 30.7%.

Thereinto were fed 0.22 g of potassium caprate and 0.03 g of phenol, and an isocyanurate-forming reaction was allowed to take place at 50° C. for 5 hours. Then, 0.3 g of phosphoric acid was fed, and stirring was conducted at 60° C. for 1 hour to terminate the isocyanurate-forming reaction. At this time, the content of isocyanate group was 26.1%. Then, thin-film distillation was conducted under the conditions of 120° C. and 13 kPa to remove free HDI, whereby was obtained a polyisocyanate curing agent NCO-B3. The yield was 55%. IR analysis of NCO-B3 confirmed the presence of isocyanate group, isocyanurate group and urethane group, but the presence of hydroxyl group could not be confirmed. In NCO-B3, the content of the isocyanate group was 5.2% and accordingly the content of the isocyanurate group was 9.7%. The solid content was 100.0%. The content of free HDI obtained by GPC was 0.4%.

SYNTHESIS EXAMPLE 11

The inside of the same reactor as used in Synthesis Example 1 was replaced with nitrogen. Into the reactor were fed 100 g of TDI (1) and 101 g of ethyl acetate, followed by uniform stirring. Thereinto was fed 0.5 g of magnesium naphthenate, after which an isocyanurate-forming reaction was allowed to take place at 75° C. for 5 hours. Then, 0.05 g of phosphoric acid was fed and stirring was conducted at 60° C. for 1 hour to terminate the isocyanurate-forming reaction to obtain a polyisocyanate curing agent NCO-B4. IR analysis of NCO-B4 confirmed the presence of isocyanate group and isocyanurate group. In NCO-B4, the content of the isocyanate group was 8.5% and accordingly the content of the isocyanurate group was 15.5%. The solid content was 49.9%. The content of free TDI (1) obtained by GPC was 0.3%.

[Preparation of Polyisocyanate Curing Agents]

Mixing was made in the proportions (g, as solid content) shown in Tables 1 to 10 to prepare polyisocyanate curing agents.

Stability with Time

Those polyisocyanate curing agents mixed each with a coupling agent were stored in a dark place at 25° C. for 1 month to evaluate their stabilities with time visually.

Evaluation standard

○: No change is seen in appearance (neither solidification nor generation of precipitate or suspended matter is seen).

X: Change in appearance is seen (solidification of generation of precipitate or suspended matter is seen).

[Synthesis of Base Resin]

The abbreviated expressions for the raw materials used in Synthesis Example 12 are as follows.

Polyol F: a polyester diol obtained from ethylene glycol/neopentyl glycol (1/1 by molar ratio) and sebacic acid/isophthalic acid (1/1 by molar ratio), a number-average molecular weight=2,000

Polyol G: a diol obtained by adding ε-caprolactone to 2,2-dimethylolbutanoic acid, number-average molecular weight=500

DBTDL: dibutyltin dilaurate

SYNTHESIS EXAMPLE 12

The inside of the same reactor as used in Synthesis Example 1 was replaced with nitrogen. Into the reactor were fed 350 g of a polyol F, 75 g of a polyol G and 215 g of ethyl acetate, followed by uniform mixing. Thereinto were fed 75 g of MDI and 0.1 g of DBTDL, and a reaction was allowed to take place at 75° C. When the presence of isocyanate group was not confirmed by IR analysis, 285 g of ethyl acetate was fed, followed by uniform stirring to obtain a polyurethane resin PU-1. The solid content of PU-1 was 50.0%.

[Evaluation of Adhesives]

Examples 1 to 40 and Comparative Examples 1 to 28

A base resin and a curing agent(s) were mixed in the proportions shown in Tables 1 to 10 to prepare laminate adhesives AD-1 to AD-68. The laminate adhesives were subjected to various tests. The results are shown in Tables 1 to 10.

Softening Point Measurement

Each laminate adhesive prepared was cast on a release paper in an as-dried thickness of about 100 μm. The resulting release paper was allowed to stand at 25° C. for 2 hours and then placed in a hot-air drier of 80° C. for 5 minutes. The release paper was taken out of the drier and allowed to stand at 35° C. for 16 hours to produce a laminated film. From this film was punched out a No. 2 dumbbell specified by JIS K 6301 to use it as a test piece. The test piece was heated at a temperature elevation rate of 10° C./min while applying a load of 49 kPa thereto, whereby the softening point of the test piece was measured. The softening point was determined as a temperature when the test piece showed rapid stretching or was cut.

Viscosity Increase Measurement

A prepared adhesive was placed in a sample bottle; the bottle was stored in a water bath of 25° C. for 1 hour; and the viscosity of the adhesive was measured using a B type viscometer and taken as an initial viscosity. The above bottle was stored in the same water bath of 25° C. for a further 24 hours, and the viscosity of the adhesive was measured using the same viscometer and taken as a viscosity after 24 hours. There was calculated a viscosity increase (%) of the adhesive according to the following formula.

Viscosity increase (%)=[(viscosity after 24 hours−initial viscosity)/(initial viscosity)]×100

The viscosity increase (%) was evaluated according to the following standard:

⊚: Viscosity increase is less than 10%.
○: viscosity increase is 10 to 30%.
Δ: Viscosity increase is 30 to 100%.
X: Viscosity increase is more than 100% or gelling occurs.

Lamination Test

1. First Method (Laminate Adhesives AD-1 to AD-13)

A corona-treated nylon (Ny) film and a corona-treated low-density polyethylene (LLDPE) film were set in a dry laminator. Then, a laminate adhesive was coated on the corona-treated surface of the Ny film using a gravure roll. The amount of the laminate adhesive coated was 3.5 g/m$^2$. The adhesive-coated Ny film was passed through a hot-air drier of 80° C. and adhered to the corona-treated surface of the LLDPE film using a nip roll. The nipping conditions were 100° C. and 0.3 MPa. Then, aging was conducted at 35° C. for 16 hours to obtain a laminated film.

The laminated film was cut into a 15-mm width and the cut sample was subjected to a T-peel test. The peeling conditions were tensile speed=300 mm/min and test atmosphere=25° C.×50% RH.

Separately, the laminated film obtained above was cut into a rectangle of 25 cm×30 cm. Two such rectangles were laminated so that the Ny film was at the outer surfaces of the resulting laminate, and the three sides of the laminate other than one short side were heat-sealed under the conditions of 220° C., 0.3 MPa and 1 second to form a bag. In this bag was placed a commercial weakly alkaline liquid synthetic detergent for home use for apparel, i.e. Attack (registered trademark, a product of Kao Corporation). The unsealed short side was heat-sealed under the conditions of 220° C., 0.3 MPa and 1 second. The resulting bag was stored at 50° C. for 2 weeks and then observed for appearance. Further, the laminated film constituting the bag after storage was cut into a 15-mm width and the resulting sample was subjected to a T-peel test. The peeling conditions were tensile speed=300 mm/min and test atmosphere=25° C.×50% RH.

The films used were as follows.

Ny film: N-1102 (thickness: 15 μm), a product of Toyobo Co., Ltd.

LLDPE film: TUX-FCD (thickness: 130 μm), a product of Tohcello Co., Ltd.

2. Second Method (Laminate Adhesives AD-14 to AD-68)

A corona-treated polyethylene terephthalate (PET) film, an aluminum (Al) foil and a corona-treated unstretched polypropylene (CPP) film were set in a dry laminator. Then, a laminate adhesive was coated on the corona-treated surface of the PET film using a gravure roll. The amount of the laminate adhesive coated was 3.5 g/m$^2$. The adhesive-coated PET film was passed through a hot-air drier of 80° C. and adhered to the Al foil using a nip roll. The nipping conditions were 100° C. and 0.3 MPa. Next, the same laminate adhesive was coated on the Al foil using a gravure roll. The amount of the laminate adhesive coated was 3.5 g/m$^2$. The PET film/Al foil laminated film having the adhesive coated on the Al foil was passed through a hot-air drier of 80° C. and adhered to the corona-treated surface of the CPP film using a nip roll. The nipping conditions were 100° C. and 0.3 MPa. Thereafter, aging was conducted at 35° C. for 16 hours to obtain a laminated film.

The laminated film was cut into a 15-mm width and the cut sample was subjected to a T-peel test. The peeling conditions were tensile speed=300 mm/min and test atmosphere=25° C.×50% RH.

Separately, the laminated film obtained above was cut into a rectangle of 25 cm×30 cm. Two such rectangles were laminated so that the PET film was at the outer surface of the resulting laminate, and the three sides of the laminate other than one short side were heat-sealed under the conditions of 180° C., 0.3 MPa and 1 second to form a bag. In this bag was placed a tomato ketchup/salad oil/vinegar (1/1/1 by weight ratio) mixture. The unsealed short side was heat-sealed under the conditions of 180° C., 0.3 MPa and 1 second. The resulting bag was subjected to a retort treatment of 120° C. and 30 minutes. The laminated film constituting the bag after retort treatment was cut into a 15-mm width and the resulting sample was subjected to a T-peel test. The peeling conditions were tensile speed=300 mm/min and test atmosphere=25° C.×50% RH.

The films used were as follows.

PET film: E-5100 (thickness: 12 $\mu$m), a product of Toyobo Co., Ltd.

Al foil: Al Foil C (thickness: 9 $\mu$m), a product of Toyo Aluminium K.K.

CPP film: CP RXC-11 (thickness: 70 $\mu$m), a product of Tohcello Co., Ltd.

TABLE 1

|  | Examples | | | | | | |
|---|---|---|---|---|---|---|---|
|  | 1 | 2 | 3 | 4 | 5 | 6 | 7 |
| Laminate adhesive (name) | AD-1 | AD-2 | AD-3 | AD-4 | AD-5 | AD-6 | AD-7 |
| Base resin: polyurethane resin (g, as solid cont.) | | | | | | | |
| PU-1 | 100 | 100 | 100 | 100 | 100 | 100 | 100 |
| Curing agent: NCO-terminated prepolymer (g, as solid cont.) | | | | | | | |
| NCO-A1 | 25 | | | | | | |
| NCO-A2 | | 25 | | | | | |
| NCO-A3 | | | 25 | | | | |
| NCO-A4 | | | | 25 | | | |
| NCO-A5 | | | | | 25 | | |
| NCO-A6 | | | | | | 25 | |
| NCO-A7 | | | | | | | 25 |
| Softening point (° C.) | 246 | 230 | 217 | 234 | 210 | 229 | 230 |
| Viscosity increase | ○ | ○ | ○ | ○ | ○ | ○ | ○ |
| Adhesion strength (N/cm) Ny/LLDPE[1] | 7.0 | 8.5 | 7.0 | 8.5 | 9.1 | 8.1 | 9.5 |
| Detergent resistance | | | | | | | |
| Appearance | Good | Good | Good | Good | Good | Good | Good |
| Adhesion strength (N/cm) Ny/LLDPE[1] | 6.9 | 8.4 | 6.7 | 8.2 | 8.9 | 7.7 | 9.4 |

[1]In each measurement of the adhesion strength of NY/LLDPE of Examples 2 and 4 to 7, the LLDPE film stretched.

TABLE 2

|  | Comparative Examples | | | | | |
|---|---|---|---|---|---|---|
|  | 1 | 2 | 3 | 4 | 5 | 6 |
| Laminate adhesive (name) | AD-8 | AD-9 | AD-10 | AD-11 | AD-12 | AD-13 |
| Base resin: polyurethane resin (g, as solid cont.) | | | | | | |
| PU-1 | 100 | 100 | 100 | 100 | 100 | 100 |
| Curing agent: NCO-terminated prepolymer (g, as solid cont.) | | | | | | |
| NCO-B1 | 25 | | | | | |
| NCO-B2 | | 25 | | | | |
| NCO-B3 | | | 10 | | | |
| NCO-B4 | | | | 25 | | |
| C-L | | | | | 15 | 15 |
| Isocyanurate-forming catalyst (g) TEA | | | | | | 0.05 |
| Softening point (° C.) | 250 | 237 | 33 | 238 | 35 | 214 |
| Viscosity increase | ○ | ○ | ◎ | ○ | ◎ | X |
| Adhesion strength (N/cm) Ny/LLDPE | 3.5 | 3.7 | 6.5 | 3.0 | 7.0 | 7.8 |
| Detergent resistance | | | | | | |
| Appearance | Good | Good | Partly peeled | Good | Partly peeled | Good |
| Adhesion strength (N/cm) Ny/LLDPE | 3.4 | 3.2 | 3.7 | 3.1 | 6.5 | 7.9 |

TABLE 3

| | Examples | | | | | | | | | |
|---|---|---|---|---|---|---|---|---|---|---|
| | 8 | 9 | 10 | 11 | 12 | 13 | 14 | 15 | 16 | 17 |
| Laminate adhesive (name) | AD-14 | AD-15 | AD-16 | AD-17 | AD-18 | AD-19 | AD-20 | AD-21 | AD-22 | AD-23 |
| Base resin: polyurethane resin (g, as solid cont.) | | | | | | | | | | |
| PU-1 | 100 | 100 | 100 | 100 | 100 | 100 | 100 | 100 | 100 | 100 |
| Curing agent: NCO-terminated prepolymer (g, as solid cont.) | | | | | | | | | | |
| NCO-A1 | | | | | | | | 20 | | |
| NCO-A2 | 22.5 | 20 | 12.5 | 20 | 20 | 20 | 20 | | | |
| NCO-A3 | | | | | | | | | 20 | |
| NCO-A4 | | | | | | | | | | 20 |
| C-L | 2.5 | 5 | 12.5 | | | | | 5 | 5 | 5 |
| C-HL | | | | 5 | | | | | | |
| NY215A | | | | | 5 | | | | | |
| D-110N | | | | | | 5 | | | | |
| D-120N | | | | | | | 5 | | | |
| Softening point (° C.) | 246 | 232 | 217 | 234 | 232 | 236 | 234 | 234 | 215 | 234 |
| Viscosity increase | ○ | ○ | ○ | ○ | ○ | ○ | ○ | ○ | ○ | ○ |
| Adhesion strength (N/cm) | | | | | | | | | | |
| PET/Al[1] | 2.6 | 2.9 | 2.6 | 2.9 | 3.2 | 3.0 | 3.0 | 2.4 | 3.0 | 2.9 |
| Al/CPP | 6.0 | 6.7 | 6.0 | 6.6 | 6.8 | 6.7 | 6.7 | 6.6 | 5.9 | 6.8 |
| Adhesion strength (N/cm) after retort treatment | | | | | | | | | | |
| PET/Al | M.I. | M.I. | M.I. | M.I. | M.I. | M.I. | M.I. | M.I. | M.I. | M.I. |
| Al/CPP | 6.2 | 6.5 | 6.2 | 6.3 | 6.5 | 6.3 | 6.3 | 6.2 | 6.0 | 6.5 |

M.I. indicates that measurement was impossible.
[1] In each measurement of the adhesion strength of PET/Al of Examples 8 to 17, the PET film fractured.

TABLE 4

| | Examples | | | Comparative Examples | | | | | |
|---|---|---|---|---|---|---|---|---|---|
| | 18 | 19 | 20 | 7 | 6 | 9 | 10 | 11 | 12 |
| Laminate adhesive (name) | AD-24 | AD-25 | AD-26 | AD-27 | AD-28 | AD-29 | AD-30 | AD-31 | AD-32 |
| Base resin: polyurethane resin (g, as solid cont.) | | | | | | | | | |
| PU-1 | 100 | 100 | 100 | 100 | 100 | 100 | 100 | 100 | 100 |
| Curing agent: NCO-terminated prepolymer (g, as solid cont.) | | | | | | | | | |
| NCO-A5 | 20 | | | | | | | | |
| NCO-A6 | | 20 | | | | | | | |
| NCO-A7 | | | 20 | | | | | | |
| NCO-B1 | | | | 20 | | | | | |
| NCO-B2 | | | | | 20 | | | | |
| NCO-B3 | | | | | | 20 | | | |
| NCO-B4 | | | | | | | 20 | | |
| C-L | 5 | 5 | 5 | 5 | 5 | 5 | 5 | 25 | 25 |
| Isocyanate-forming catalyst (g) TEA | | | | | | | | | 0.0125 |
| Softening point (° C.) | 227 | 230 | 230 | 250 | 220 | 35 | 238 | 35 | 214 |
| Viscosity increase | ○ | ○ | ○ | ○ | ○ | ⊚ | ○ | ⊚ | X |
| Adhesion strength (N/cm) | | | | | | | | | |
| PET/Al[1] | 3.4 | 2.6 | 3.0 | 1.4 | 1.8 | 3.1 | 1.4 | 3.6 | 3.2 |
| Al/CPP | 7.2 | 6.2 | 6.8 | 3.0 | 3.4 | 4.5 | 2.8 | 5.0 | 6.6 |
| Adhesion strength (N/cm) after retort treatment | | | | | | | | | |
| PET/Al[2] | M.I. | M.I. | M.I. | 1.2 | 2.8 | 2.4 | 1.2 | 2.7 | M.I. |
| Al/CPP[2] | 7.0 | 6.1 | 6.5 | 2.8 | 3.5 | 3.3 | 2.7 | 4.2 | 6.2 |

M.I. indicates that measurement was impossible.
[1] In Examples 18 to 20, breakage of PET film occurred in the measurement of the adhesion strength of PET/Al.
[2] In Comparative Examples 9 and 11, delamination occurred partially in the measurement of the adhesion strength after retort treatment, of PET/Al and Al/CPP.

TABLE 5

|  | Examples | | | | | | |
| --- | --- | --- | --- | --- | --- | --- | --- |
|  | 21 | 22 | 23 | 24 | 25 | 26 | 27 |
| Laminate adhesive (name) | AD-33 | AD-34 | AD-35 | AD-36 | AD-37 | AD-38 | AD-39 |
| Base resin: polyurethane resin (g, as solid cont.) | | | | | | | |
| PU-1 | 100 | 100 | 100 | 100 | 100 | 100 | 100 |
| Curing agent: NCO-terminated prepolymer (g, as solid cont.) | | | | | | | |
| NCO-A1 | 25 | | | | | | |
| NCO-A2 | | 25 | | | | | |
| NCO-A3 | | | 25 | | | | |
| NCO-A4 | | | | 25 | | | |
| NCO-A5 | | | | | 25 | | |
| NCO-A6 | | | | | | 25 | |
| NCO-A7 | | | | | | | 25 |
| Silane coupling agent (g) | | | | | | | |
| SC-1 | 0.25 | | 0.125 | | 0.75 | | 0.25 |
| SC-2 | | 0.25 | | 0.5 | | 1.25 | |
| Stability with time of coupling agent-mixed curing agent | ○ | ○ | ○ | ○ | ○ | ○ | ○ |
| Softening point (° C.) | 246 | 230 | 215 | 232 | 210 | 230 | 230 |
| Viscosity increase | ○ | ○ | ○ | ○ | ○ | ○ | ○ |
| Adhesion strength (N/cm) | | | | | | | |
| PET/Al[1] | 2.7 | 3.1 | 3.0 | 3.1 | 3.5 | 3.2 | 3.3 |
| Al/CPP | 6.8 | 7.0 | 6.4 | 6.9 | 7.8 | 6.6 | 7.0 |
| Adhesion strength (N/cm) after retort treatment | | | | | | | |
| PET/Al | M.I. | M.I. | M.I. | M.I. | M.I. | M.I. | M.I. |
| Al/CPP | 6.2 | 6.3 | 6.3 | 7.6 | 7.0 | 6.5 | 6.7 |

M.I. indicates that measurement was impossible.
[1] In Examples 21 to 27, breakage of PET film occurred in the measurement of the adhesion strength of PET/Al.

TABLE 6

|  | Examples | | | | | | |
| --- | --- | --- | --- | --- | --- | --- | --- |
|  | 28 | 29 | 30 | 31 | 32 | 33 | 34 |
| Laminate adhesive (name) | AD-40 | AD-41 | AD-42 | AD-43 | AD-44 | AD-45 | AD-46 |
| Base resin: polyurethane resin (g, as solid cont.) | | | | | | | |
| PU-1 | 100 | 100 | 100 | 100 | 100 | 100 | 100 |
| Curing agent: NCO-terminated prepolymer (g, as solid cont.) | | | | | | | |
| NCO-A2 | 22.5 | 20 | 12.5 | 20 | 20 | 20 | 20 |
| C-L | 2.5 | 5 | 12.5 | | | | |
| C-HL | | | | 5 | | | |
| NY215A | | | | | 5 | | |
| D-110N | | | | | | 5 | |
| D-120N | | | | | | | 5 |
| Silane coupling agent (g) | | | | | | | |
| SC-1 | 0.25 | | 0.5 | | 0.25 | | 1.25 |
| SC-2 | | 0.25 | | 0.125 | | 0.75 | |
| Stability with time of coupling agent-mixed curing agent | ○ | ○ | ○ | ○ | ○ | ○ | ○ |
| Softening point (° C.) | 245 | 230 | 217 | 231 | 235 | 235 | 234 |
| Viscosity increase | ○ | ○ | ○ | ○ | ○ | ○ | ○ |
| Adhesion strength (N/cm) | | | | | | | |
| PET/Al[1] | 3.0 | 3.3 | 3.0 | 3.2 | 3.8 | 3.4 | 3.4 |
| Al/CPP | 6.2 | 7.0 | 6.4 | 6.9 | 7.8 | 7.2 | 7.2 |

TABLE 6-continued

|  | Examples | | | | | | |
| --- | --- | --- | --- | --- | --- | --- | --- |
|  | 28 | 29 | 30 | 31 | 32 | 33 | 34 |
| Adhesion strength (N/cm) after |  |  |  |  |  |  |  |
| retort treatment |  |  |  |  |  |  |  |
| PET/Al | M.I. | M.I. | M.I. | M.I. | M.I. | M.I. | M.I. |
| Al/CPP | 6.2 | 7.1 | 6.2 | 7.0 | 7.7 | 7.0 | 7.2 |

M.I. indicates that measurement was impossible.
[1]In Examples 28 to 34, breakage of PET film occurred in the measurement of the adhesion strength of PET/Al.

TABLE 7

|  | Examples | | | | | |
| --- | --- | --- | --- | --- | --- | --- |
|  | 35 | 36 | 37 | 38 | 39 | 40 |
| Laminate adhesive (name) | AD-47 | AD-48 | AD-49 | AD-50 | AD-51 | AD-52 |
| Base resin: polyurethane resin (g, as solid cont.) |  |  |  |  |  |  |
| PU-1 | 100 | 100 | 100 | 100 | 100 | 100 |
| Curing agent: NCO-terminated prepolymer (g, as solid cont.) |  |  |  |  |  |  |
| NCO-A1 | 20 |  |  |  |  |  |
| NCO-A3 |  | 20 |  |  |  |  |
| NCO-A4 |  |  | 20 |  |  |  |
| NCO-A5 |  |  |  | 20 |  |  |
| NCO-A6 |  |  |  |  | 20 |  |
| NCO-A7 |  |  |  |  |  | 20 |
| C-L | 5 | 5 | 5 | 5 | 5 | 5 |
| Silane coupling agent (g) |  |  |  |  |  |  |
| SC-1 | 0.25 |  | 0.5 |  | 1.25 |  |
| SC-2 |  | 0.25 |  | 0.125 |  | 0.25 |
| Stability with time of coupling agent-mixed curing agent | ○ | ○ | ○ | ○ | ○ | ○ |
| Softening point (° C.) | 230 | 215 | 232 | 227 | 230 | 228 |
| Viscosity increase | ○ | ○ | ○ | ○ | ○ | ○ |
| Adhesion strength (N/cm) |  |  |  |  |  |  |
| PET/Al[1] | 2.8 | 3.2 | 3.0 | 3.7 | 3.0 | 3.4 |
| Al/CPP | 7.2 | 6.5 | 7.1 | 8.0 | 6.7 | 7.1 |
| Adhesion strength (N/cm) after retort treatment |  |  |  |  |  |  |
| PET/Al | M.I. | M.I. | M.I. | M.I. | M.I. | M.I. |
| Al/CPP | 6.7 | 6.4 | 7.0 | 7.2 | 6.7 | 6.9 |

M.I. indicates that measurement was impossible.
[1]In Examples 35 to 40, breakage of PET film occurred in the measurement of the adhesion strength of PET/Al.

TABLE 8

|  | Comparative Examples | | | | | |
| --- | --- | --- | --- | --- | --- | --- |
|  | 13 | 14 | 15 | 16 | 17 | 18 |
| Laminate adhesive (name) | AD-53 | AD-54 | AD-55 | AD-56 | AD-57 | AD-58 |
| Base resin: polyurethane resin (g, as solid cont.) |  |  |  |  |  |  |
| PU-1 | 100 | 100 | 100 | 100 | 100 | 100 |
| Curing agent: NCO-terminated prepolymer (g, as solid cont.) |  |  |  |  |  |  |
| NCO-A2 | 25 |  |  |  |  |  |
| NCO-B1 |  | 25 |  |  |  |  |
| NCO-B2 |  |  | 25 |  |  |  |
| NCO-B3 |  |  |  | 25 |  |  |
| NCO-B4 |  |  |  |  | 25 |  |

TABLE 8-continued

| | Comparative Examples | | | | | |
|---|---|---|---|---|---|---|
| | 13 | 14 | 15 | 16 | 17 | 18 |
| Silane coupling agent (g) | | | | | | |
| SC-1 | | 0.25 | 0.25 | 0.25 | 0.25 | |
| SC-3 | 0.25 | | | | | |
| Stability with time of coupling agent-mixed curing agent | X | ○ | ○ | ○ | ○ | ○ |
| Softening point (° C.) | 230 | 247 | 237 | 33 | 240 | 230 |
| Viscosity increase | ○ | ○ | ○ | ⊙ | ○ | ⊙ |
| Adhesion strength (N/cm) | | | | | | |
| PET/Al[1)] | | 3.0 | 1.2 | 1.8 | 3.0 | 1.1 | 2.9 |
| Al/CPP | | 6.5 | 3.0 | 3.1 | 4.2 | 2.8 | 6.1 |
| Adhesion strength (N/cm) after retort treatment | | | | | | |
| PET/Al[2)] | M.I. | 1.2 | 2.7 | 2.1 | 1.0 | 2.1 |
| Al/CPP[2)] | 7.0 | 2.8 | 3.5 | 3.4 | 2.6 | 3.2 |

M.I. indicates that measurement was impossible.
[1)]In Comparative Examples 13 and 18, breakage of PET film occurred in the measurement of the adhesion strength of PET/Al.
[2)]In Comparative Example 16, delamination occurred partially in the measurement of the adhesion strength after retort treatment, of PET/Al and Al/CPP.

TABLE 9

| | Comparative Examples | | | | |
|---|---|---|---|---|---|
| | 19 | 20 | 21 | 22 | 23 |
| Laminate adhesive (name) | AD-59 | AD-60 | AD-61 | AD-62 | AD-63 |
| Base resin: polyurethane resin (g, as solid cont.) | | | | | |
| PU-1 | 100 | 100 | 100 | 100 | 100 |
| Curing agent: NCO-terminated prepolymer (g, as solid cont.) | | | | | |
| NCO-A2 | 20 | | | | |
| NCO-B1 | | 20 | | | |
| NCO-B2 | | | 20 | | |
| NCO-B3 | | | | 20 | |
| NCO-B4 | | | | | 20 |
| C-L | 5 | 5 | 5 | 5 | 5 |
| Silane coupling agent (g) | | | | | |
| SC-1 | | 0.25 | 0.25 | 0.25 | 0.25 |
| SC-3 | 0.25 | | | | |
| Stability with time of coupling agent-mixed curing agent | X | ○ | ○ | ○ | ○ |
| Softening point (° C.) | 230 | 250 | 218 | 33 | 235 |
| Viscosity increase | ○ | ○ | ○ | ⊙ | ○ |
| Adhesion strength (N/cm) | | | | | |
| PET/Al[1)] | 3.2 | 1.4 | 2.0 | 3.3 | 1.4 |
| Al/CPP | 7.0 | 3.3 | 3.5 | 4.7 | 3.0 |

TABLE 9-continued

| | Comparative Examples | | | | |
|---|---|---|---|---|---|
| | 19 | 20 | 21 | 22 | 23 |
| Adhesion strength (N/cm) after retort treatment | | | | | |
| PET/Al[2)] | M.I. | 1.4 | 2.8 | 2.2 | 1.2 |
| Al/CPP[2)] | 7.2 | 3.0 | 3.6 | 3.4 | 2.8 |

M.I. indicates that measurement was impossible.
[1)]In Comparative Examples 19, breakage of PET film occurred in the measurement of the adhesion strength of PET/Al.
[2)]In Comparative Example 22, delamination occurred partially in the measurement of the adhesion strength after retort treatment, of PET/Al and Al/CPP.

TABLE 10

| | Comparative Examples | | | | |
|---|---|---|---|---|---|
| | 24 | 25 | 26 | 27 | 28 |
| Laminate adhesive (name) | AD-64 | AD-65 | AD-66 | AD-67 | AD-68 |
| Base resin: polyurethane resin (g, as solid cont.) | | | | | |
| PU-1 | 100 | 100 | 100 | 100 | 100 |
| Curing agent: NCO-terminated prepolymer (g, as solid cont.) | | | | | |
| NCO-A2 | | | | | 20 |
| C-L | 25 | 25 | 25 | 25 | 5 |
| Silane coupling agent (g) | | | | | |
| SC-1 | | 0.25 | | 0.25 | |
| SC-3 | 0.25 | | 0.25 | | |
| Isocyanurate-forming catalyst (g) | | | 0.0125 | 0.0125 | |
| TEA | | | | | |

TABLE 10-continued

|  | Comparative Examples | | | | |
| --- | --- | --- | --- | --- | --- |
|  | 24 | 25 | 26 | 27 | 28 |
| Stability with time of coupling agent-mixed curing agent | X | ◯ | X | X | ◯ |
| Softening point (° C.) | 38 | 40 | 217 | 215 | 230 |
| Viscosity increase | ⊚ | ⊚ | X | X | ⊚ |
| Adhesion strength (N/cm) | | | | | |
| PET/Al[1] | 3.6 | 3.4 | 3.4 | 3.2 | 3.1 |
| Al/CPP | 5.2 | 5.4 | 7.0 | 7.0 | 7.0 |
| Adhesion strength (N/cm) after retort treatment | | | | | |
| PET/Al[1] | 2.9 | 2.7 | M.I. | M.I. | 2.9 |
| Al/CPP[1] | 5.0 | 5.1 | 6.9 | 7.1 | 3.8 |

M.I. indicates that measurement was impossible.
[1]In Comparative Examples 24 and 25, delamination occurred partially in the measurement of the adhesion strength after retort treatment, of PET/Al and Al/CPP.

In Tables 1 to 10,

C-L: Coronate (registered trademark) L,
a urethane bond-containing polyisocyanate derived from TDI and TMP, a product of NIPPON POLYURETHANE INDUSTRY CO., LTD.,
isocyanate group content=13.2%, solid content=75%, an ethyl acetate solution C-HL: Coronate HL,
a urethane bond-containing polyisocyanate derived from HDI and TMP, a product of NIPPON POLYURETHANE INDUSTRY CO., LTD.,
isocyanate group content=12.8%, solid content=75%, an ethyl acetate solution NY215A: Mitec (registered trademark) NY215A,
a urethane bond-containing polyisocyanate derived from IPDI and TMP, a product of Mitsubishi Chemical Corporation,
isocyanate group content=10.5%, solid content=75%, an ethyl acetate solution D-110N: Takenate (registered trademark) D-110N,
a urethane bond-containing polyisocyanate derived from XDI and TMP, a product of Takeda Chemical Industries, Ltd.,
isocyanate group content=11.5%, solid content=75%, an ethyl acetate solution D-120N: Takenate D-120N,
a urethane bond-containing polyisocyanate derived from $H_6XDI$ and TMP, a product of Takeda Chemical Industries, Ltd.,
isocyanate group content=11.0%, solid content=75%, an ethyl acetate solution TEA: triethylamine
SC-1: γ-isocyanatopropyltrimethoxysilane
SC-2: γ-isocyanatopropyltriethoxysilane
SC-3: γ-aminopropyltrimethoxysilane As is clear from Tables 1, 3 and 4, the laminate adhesives AD-1 to AD-7 and AD-14 to AD-26 of Examples 1 to 20 showed a small viscosity increase even after mixing of the base resin and the curing agent and had a sufficient pot life. Yet, these laminate adhesives had a high softening point and high reactivity. Therefore, a sufficient crosslinking reaction is considered to have taken place under the film-forming conditions (25° C.×2 hours+80° C.×5 minutes+35° C.×16 hours). Further, in the lamination using these laminate adhesives, sufficient adhesivity was obtained in a short aging time of 16 hours (this is ⅓ or less of conventional aging time).

As is clear from Table 2, the laminate adhesives AD-8 and AD-9 of Comparative Examples 1 and 2 have a high softening point and accordingly a sufficient crosslinking reaction is considered to have taken place. However, these laminate adhesives showed low adhesivity because the polyol used therein had an inappropriate molecular weight. Comparative Example 4 using no polyol showed the same tendency as Comparative Examples 1 and 2. Comparative Examples 3 and 5 showed a low softening point and therefore no sufficient crosslinking reaction is considered to have taken place under the above-mentioned film-forming conditions. The adhesion strength was good; however, since there was no sufficient curing, the detergent resistance was insufficient. Comparative Example 6, which was a combination of the laminate adhesive AD-13 of Comparative Example 5 and a catalyst, was improved in the reactivity between base resin and curing agent but short in pot life; therefore, its actual use is difficult in view of the coating operation of the laminate adhesive.

As is clear from Table 4, the laminate adhesives AD-27 and AD-28 of Comparative Examples 7 and 8 had a high softening point and are therefore considered to have given rise to a sufficient crosslinking reaction. However, since the polyol used therein had an inappropriate molecular weight, they had low adhesivity. Comparative Example 10 using no polyol showed the same tendency as Comparative Examples 7 and 8. Comparative Examples 9 and 11 showed a low softening point and therefore no sufficient crosslinking reaction is considered to have taken place under the above-mentioned film-forming conditions. The adhesion strength was good; however, since there was no sufficient curing, the adhesion strength after retort treatment was insufficient. Comparative Example 12, which was a combination of the laminate adhesive AD-31 of Comparative Example 11 and a catalyst, was improved in the reactivity between base resin and curing agent but short in pot life; therefore, its actual use is difficult in view of the coating operation of the laminate adhesive.

As is clear from Tables 5 to 10, the polyisocyanate curing agents to which an amino group-containing silane coupling agent was added, were inferior in stability with time, and none of them satisfied both of the pot life and the aging time.

What is claimed is:

1. A polyisocyanate curing agent for a laminate adhesive comprising:
   (A) an isocyanate group-terminated prepolymer having isocyanurate group and urethane group, obtained by reacting an organic polyisocyanate containing at least (a1) an aromatic diisocyanate, with an active hydrogen group-containing compound containing at least (a2) a diol compound having a number-average molecular weight of 100 to 2,000, and
   (B) an isocyanate group-terminated prepolymer having urethane group,
   wherein the component (B) is an isocyanate group-terminated prepolymer having urethane group, obtained by reacting (b1) an organic diisocyanate with (b2) a polyhydric alcohol.

2. A polyisocyanate curing agent for laminate adhesive, comprising:
   (A) an isocyanate group-terminated prepolymer having isocyanurate group and urethane group, obtained by reacting an organic polyisocyanate containing at least (a1) an aromatic diisocyanate, with an active hydrogen group-containing compound containing at least (a2) a diol compound having a number-average molecular weight of 100 to 2,000, and (C) a silane coupling agent represented by the following general formula (1):

$$OCN-(CH_2)_m-Si(OR)_3 \quad (1)$$

(wherein R is a methyl group or an ethyl group, and m is an integer of 1 to 5).

3. The polyisocyanate curing agent for laminate adhesive according to claim 2, wherein the organic polyisocyanate is (a1) an aromatic diisocyanate and the active hydrogen group-containing compound is (a2) a diol compound having a number-average molecular weight of 100 to 2,000.

4. A polyisocyanate curing agent for laminate adhesive, comprising:

(A) an isocyanate group-terminated prepolymer having isocyanurate group and urethane group, obtained by reacting an organic polyisocyanate containing at least (a1) an aromatic diisocyanate, with an active hydrogen group-containing compound containing at least (a2) a diol compound having a number-average molecular weight of 100 to 2,000, (B) an isocyanate group-terminated prepolymer having urethane group, and (C) a silane coupling agent represented by the following general formula (1):

$$OCN-(CH_2)_m-Si(OR)_3 \quad (1)$$

(wherein R is a methyl group or an ethyl group, and m is an integer of 1 to 5).

5. The polyisocyanate curing agent for laminate adhesive according to claim 4, wherein the organic polyisocyanate is (a1) an aromatic diisocyanate and the active hydrogen group-containing compound is (a2) a diol compound having a number-average molecular weight of 100 to 2,000.

6. The polyisocyanate curing agent for laminate adhesive according to claim 4, wherein component (B) is an isocyanate group-terminated prepolymer having urethane group, obtained by reacting (b1) an organic diisocyanate with (b2) a polyhydric alcohol.

7. A process for producing a polyisocyanate curing agent for a laminate adhesive comprising:

(A) an isocyanate group-terminated prepolymer having isocyanurate group and urethane group, obtained by reacting an organic polyisocyanate containing at least (a1) an aromatic diisocyanate, with an active hydrogen group-containing compound containing at least (a2) a diol compound having a number-average molecular weight of 100 to 2,000, and (B) an isocyanate group-terminated prepolymer having urethane group, which process comprises the following steps (1), (2) and (6):

(1) a step of subjecting an organic polyisocyanate containing at least (a1) an aromatic diisocyanate and an active hydrogen group-containing compound containing at least (a2) a diol compound having a number-average molecular weight of 100 to 2,000, to an urethanization reaction to produce a urethane bond-containing polyisocyanate, (2) a step of subjecting the urethane bond-containing polyisocyanate to an isocyanurate-forming reaction to produce (A) an isocyanate group-terminated prepolymer having isocyanurate group and urethane group, and (6) a step of mixing the isocyanate group-terminated prepolymer (A) having isocyanurate group and urethane group, with (B) an isocyanate group-terminated prepolymer having urethane group.

8. The process for producing a polyisocyanate curing agent for laminate adhesive according to claim 7, wherein the organic polyisocyanate is (a1) an aromatic diisocyanate and the active hydrogen group-containing compound is (a2) a diol compound having a number-average molecular weight of 100 to 2,000.

9. The process for producing a polyisocyanate curing agent for laminate adhesive according to claim 7, wherein the component (B) is an isocyanate group-terminated prepolymer having urethane group, obtained by reacting (b1) an organic diisocyanate with (b2) a polyhydric alcohol.

10. A process for producing a polyisocyanate curing agent for a laminate adhesive comprising:

(A) an isocyanate group-terminated prepolymer having isocyanurate group and urethane group, obtained by reacting an organic polyisocyanate containing at least (a1) an aromatic diisocyanate, with an active hydrogen group-containing compound containing at least (a2) a diol compound having a number-average molecular weight of 100 to 2,000, and (B) an isocyanate group-terminated prepolymer having urethane group, which process comprises the following steps (3), (4) and (7):

(3) a step of subjecting an organic polyisocyanate containing at least (a1) an aromatic diisocyanate to an isocyanurate-forming reaction to produce an isocyanurate bond-containing polyisocyanate, (4) a step of subjecting the isocyanurate bond-containing polyisocyanate and an active hydrogen group-containing compound containing at least (a2) a diol compound having a number-average molecular weight of 100 to 2,000, to a urethanization reaction to produce (A) an isocyanate group-terminated prepolymer having isocyanurate group and urethane group, and (7) a step of mixing the isocyanate group-terminated prepolymer (A) having isocyanurate group and urethane group, with (B) an isocyanate group-terminated prepolymer having urethane group.

11. The process for producing a polyisocyanate curing agent for laminate adhesive according to claim 10, wherein the organic polyisocyanate is (a1) an aromatic diisocyanate and the active hydrogen group-containing compound is (a2) a diol compound having a number-average molecular weight of 100 to 2,000.

12. The process for producing a polyisocyanate curing agent for laminate adhesive according to claim 10, wherein the component (B) is an isocyanate group-terminated prepolymer having urethane group, obtained by reacting (b1) an organic diisocyanate with (b2) a polyhydric alcohol.

13. A process for producing a polyisocyanate curing agent for a laminate adhesive comprising:

(A) an isocyanate group-terminated prepolymer having isocyanurate group and urethane group, obtained by reacting an organic polyisocyanate containing at least (a1) an aromatic diisocyanate, with an active hydrogen group-containing compound containing at least (a2) a diol compound having a number-average molecular weight of 100 to 2,000, and (B) an isocyanate group-terminated prepolymer having urethane group, which process comprises the following steps (5) and (8):

(5) a step of subjecting an organic polyisocyanate containing at least (a1) an aromatic diisocyanate and an active hydrogen group-containing compound containing at least (a2) a diol compound having a number-average molecular weight of 100 to 2,000, to a urethanization reaction and an isocyanurate-forming reaction simultaneously to produce (A) an isocyanate group-terminated prepolymer having isocyanurate group and urethane group, and (8) a step of mixing the isocyanate group-terminated prepolymer (A) having isocyanurate group and urethane group, with (B) an isocyanate group-terminated prepolymer having urethane group.

14. The process for producing a polyisocyanate curing agent for laminate adhesive according to claim 13, wherein the organic polyisocyanate is (a1) an aromatic diisocyanate and the active hydrogen group-containing compound is (a2) a diol compound having a number-average molecular weight of 100 to 2,000.

15. The process for producing a polyisocyanate curing agent for laminate adhesive according to claim 13, wherein the component (B) is an isocyanate group-terminated prepolymer having urethane group, obtained by reacting (b1) an organic diisocyanate with (b2) a polyhydric alcohol.

* * * * *